United States Patent
Persson et al.

(10) Patent No.: US 9,473,966 B2
(45) Date of Patent: *Oct. 18, 2016

(54) ENABLING REPORTING OF NON-REAL-TIME MDT MEASUREMENTS

(75) Inventors: Håkan Persson, Solna (SE); Henrik Enbuske, Stockholm (SE); Janne Peisa, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 396 days.

This patent is subject to a terminal disclaimer.

(21) Appl. No.: 13/028,394

(22) Filed: Feb. 16, 2011

(65) Prior Publication Data

US 2011/0199923 A1 Aug. 18, 2011

Related U.S. Application Data

(63) Continuation of application No. PCT/EP2011/052220, filed on Feb. 15, 2011.

(60) Provisional application No. 61/304,963, filed on Feb. 16, 2010.

(51) Int. Cl.
*H04W 24/10* (2009.01)

(52) U.S. Cl.
CPC .................... *H04W 24/10* (2013.01)

(58) Field of Classification Search
CPC ... H04W 24/00; H04W 24/10; H04W 24/08; H04L 43/00; H04L 43/50; H04L 43/06; H04L 43/062; H04L 43/08; H04L 43/0805; H04L 43/0811; H04L 43/0876; H04L 43/0882; H04L 43/0888; H04L 43/0894; H04B 17/003; H04B 17/004
USPC ............. 370/241, 252; 455/39, 67.11, 67.13, 455/423, 425
See application file for complete search history.

(56) References Cited

U.S. PATENT DOCUMENTS

| | | |
|---|---|---|
| 7,313,791 B1 | 12/2007 | Chen et al. |
| 2002/0161913 A1 | 10/2002 | Gonzalez et al. |

(Continued)

FOREIGN PATENT DOCUMENTS

| | | |
|---|---|---|
| CN | 101521901 A | 9/2009 |
| JP | 2013519330 A | 5/2013 |

(Continued)

OTHER PUBLICATIONS

International Preliminary Report on Patentability, mailed Jan. 25, 2012, in connection with International Application No. PCT/EP2011/052219.

(Continued)

*Primary Examiner* — Chi H Pham
*Assistant Examiner* — Weibin Huang
(74) *Attorney, Agent, or Firm* — Coats & Bennett, P.L.L.C.

(57) ABSTRACT

Methods and apparatus for informing a network node of a wireless communication network of the presence of logged measurements are disclosed. A first mobile station performs measurements concerning one or more connectivity aspects for the first mobile station in relation to the wireless communication network and stores the measurements in an internal log, where the measurements are performed according to a reporting configuration for the first mobile station. The first mobile station then sends a notification to the first network node regarding the presence of logged measurements in order to enable the first network node to respond to the notification with a request for a logged measurement report.

29 Claims, 7 Drawing Sheets

(56) References Cited

U.S. PATENT DOCUMENTS

| | | | |
|---|---|---|---|
| 2005/0119020 A1 | 6/2005 | Cheng et al. | |
| 2005/0136946 A1 | 6/2005 | Trossen et al. | |
| 2007/0291770 A1* | 12/2007 | Kitazoe | H04J 11/0093 370/395.52 |
| 2008/0031368 A1 | 2/2008 | Lindoff et al. | |
| 2008/0092638 A1* | 4/2008 | Brenneman | G06F 19/3418 73/61.41 |
| 2009/0042601 A1* | 2/2009 | Wang | H04W 36/0088 455/553.1 |
| 2010/0190488 A1 | 7/2010 | Jung et al. | |
| 2010/0254351 A1* | 10/2010 | Wang | H04J 11/0069 370/332 |
| 2010/0316034 A1 | 12/2010 | Burbidge et al. | |
| 2011/0183662 A1* | 7/2011 | Lee | H04W 24/10 455/422.1 |
| 2011/0194441 A1 | 8/2011 | Jung et al. | |
| 2011/0201279 A1* | 8/2011 | Suzuki | H04W 24/10 455/67.11 |
| 2011/0201324 A1 | 8/2011 | Persson | |
| 2012/0314566 A1* | 12/2012 | Lee et al. | 370/225 |

FOREIGN PATENT DOCUMENTS

| | | |
|---|---|---|
| WO | 0070897 A1 | 11/2000 |
| WO | 2006/063309 A2 | 6/2006 |
| WO | 2009105991 A1 | 9/2009 |
| WO | 2010087625 A2 | 8/2010 |
| WO | 2011093666 A2 | 8/2011 |

OTHER PUBLICATIONS

QUALCOMM Europe, Framework for UE SON Reports, S5-090017, Jan. 12, 2008, 3GPP TSG RAN WG3 & SA WG5, Sophia Antipolis, France.

Orange et al., MDT Measurement Model, R2-100239, Jan. 18, 2010, 3GPP TSG RAN WG2 Meeting 68bis, Valencia, Spain.

Ericsson, Triggers for Logged MDT Measurement Reporting, R2-101426, Feb. 22, 2010, 3GPPP TSG RAN WG2 Meeting 69, San Francisco, USA.

3GPP TS 25.331, V9.1.0, Technical Specification Group Radio Access Network; Radio Resource Control (RRC); Protocol Specification (Release 9), Dec. 2009.

3GPP TS 36.211, V9.0.0, Technical Specification Group Radio Access Network; Evolved Universal Terrestrial Radio Access (E-UTRA); Physical Channels and Modulation (Release 9), Dec. 2009.

3GPP TS 36.331, V9.1.0, Technical Specification Group Radio Access Network; Evolved Universal Terrestrial Radio Access (E-UTRA) Radio Resource Control (RRC); Protocol Specification (Release 9), Dec. 2009.

3GPP TR 36.805, V1.2.0, R2-095325, Technical Specification Group Radio Access Network; Study on Minimization of drive-tests in Next Generation Networks, Release 9, Sep. 2009.

3GPP "Triggering of Reporting of MDT Measurements." TSG RAN WG2 Meeting #68-bis; R2-100261; XP-002633874; Valencia, Spain, Jan. 18-22, 2010; pp. 1-4.

3GPP. "Consideration on Priority of MDT Report." TSG-RAN WG2 Meeting #68bis. R2-100074. Valencia, Spain, Jan. 18-22, 2010. 3GPP, Sophia Antipolis, France.

Yl et al. U.S. Appl. No. 61/302,927, filed Feb. 9, 2010.

3GPP. "Consideration on reporting policy for MDT." 3GPP TSG-RAN WG2 meeting #66bis. R2-093709. Los Angeles, CA. Jun. 2009. 3GPP, Sophia Antipolis, France.

3GPP. "Technical Specification Group Radio Access Network; Study on Minimization of drive-in tests in Next Generation Networks; (Release 9)." 3GPP TR 36.805 V9.0.0. Dec. 2009. 3GPP, Sophia Antipolis, France.

3GPP. "Discussion on architecture for MDT." 3GPP TSG-RAN WG2 #67bis. Tdoc R2-095779. Oct. 2009. 3GPP, Sophia Antipolis, France.

3GPP. "MDT Considerations." Email discussion. 3GPP TSG-RAN WG2 meeting #68bis. R2-10XXX. Feb. 2010. 3GPP, Sophia Antipolis, France.

3GPP. "Support of UE-originated RLF reporting for Mobility Robustness SON use case." Change Request. 3GPP TSG-WG2 Meeting #68bis. R2-100750. Jan. 2010. 3GPP, Sophia Antipolis, France.

* cited by examiner

ENABLING REPORTING OF NON-REAL-TIME MDT MEASUREMENTS

TECHNICAL FIELD

The invention generally relates to the provision of measurement reports to a network from a mobile station. More particularly, the invention relates to a method and computer program product for informing a first network node of a wireless communication network of the presence of logged measurements from a first mobile station, such a mobile station, a method and a computer program product for enabling a mobile station to inform a first network node of the wireless communication network of the presence of logged measurements and a network node for enabling the mobile station to inform of the presence of logged measurements.

BACKGROUND

Mobile stations, often denoted user equipment, have a need to measure various network parameters. Such measurements may be stored in measurement logs and then reported to the network.

The Third Generation Partnership Project (3GPP) is in the process of defining solutions for Minimizing Drive Tests (MDT). The intention of the work is documented in 3GPP Technical Report (TR) 36.805, where mobile stations or user equipment (UE) measurement logging functions are described.

A network (NW) can request the mobile station to perform some logging of measurements. The mobile station executes the logging as requested by the network with certain constraints, e.g. location information availability. Reporting of mobile station measurement log can be separately configured. This means that the period of logging and that for reporting can be different.

The most important use case for MDT is coverage optimization. For coverage optimization, the following mobile station measurements (or similar functionality) are considered:
  periodic downlink pilot measurements
  Serving Cell becomes worse than threshold
  transmit power headroom becomes less than threshold
  Paging Channel failure, such as Paging Control Channel (PCCH) Decode Error
  Broadcast Channel failure The details of the reporting criteria have not been considered, but real-time reporting and/or non-real-time reporting (also known as logged or deferred reporting) can be required.

Possible triggers for non-real-time measurements include:
  periodical downlink pilot measurements: radio environment measurements, such as Common Pilot Channel (CPICH) Received Signal Code Power (RSCP), Common Pilot Channel Energy per chip to Noise ratio (CPICH Ec/No), or Time Division Duplexing (TDD) Primary Common Control Physical Channel (P-CCPCH) Received Signal Code Power (RSCP) and Interference Signal Code Power (ISCP), Reference Signal Received Power (RSRP) and Reference Signal Received Quality (RSRQ) (connected mode only) are logged periodically;
  Serving Cell becomes worse than threshold: radio environment measurements, such as CPICH RSCP, CPICH Ec/No, or TDD P-CCPCH RSCP and ISCP, RSRP and RSRQ (connected mode only), are logged when the serving cell metric becomes worse than the configured threshold. A measurement logging window (i.e. "sliding window" in which collected logs are kept in the UE) is used in order to be able to collect information during a certain period before and after the occurrence of event;
  transmit power headroom becomes less than threshold: transmit power headroom and radio environment measurements, such as CPICH RSCP, CPICH Ec/No, or TDD P-CCPCH RSCP and ISCP, RSRP and RSRQ (connected mode only) are logged when UE transmit power headroom becomes less than the configured threshold;
  random access failure: details on the random access and radio environment measurements, such as CPICH RSCP, CPICH Ec/No, or TDD P-CCPCH RSCP and ISCP, RSRP, and RSRQ (connected mode only) are logged when a random access failure occurs.

An example of real-time reporting is radio resource management (RRM) reporting specified in 3GPP Technical Specification (TS) 25.331 and 3GPP TS 36.331. The details of non-real-time reporting (deferred reporting) are not specified, making it impossible for the network to control the reporting.

One particular issue is the support of the non-real-time reporting in the network. Not all network nodes may be upgraded to support reception of the non-real-time reports, potentially leading to the network discarding the received logged measurement report. Currently the mobile station has no way to know if the network is prepared to receive the logged measurement report.

SUMMARY

The invention is therefore directed towards providing measures that raise the reliability of providing logged measurement reports to a network from a mobile station.

Among other things, this invention enables a mechanism to control the reporting of the non-real-time reporting.

In one aspect of the invention, a mobile station indicates availability of a logged measurement report to a network and delivers the actual logged measurement report, for example after the network has indicated it is prepared to receive the measurement report.

In another aspect of the invention, a mobile station includes a memory arranged for storing reporting data such as MDT data and a processor that controls the collection of data and controls the delivery to the network of MDT data according to information, such as requirements, received from the network.

One object of the present invention is to make a mobile station ensure that logged measurement reports are sent from the mobile station to a network node in a reliable way.

This object is according to a first aspect of the invention achieved through a method of informing a first network node of a wireless communication network of the presence of logged measurements from a first mobile station, the method comprising: performing measurements concerning one or more connectivity aspects for the first mobile station in relation to the wireless communication network, where the measurements are being performed according to a reporting configuration for the first mobile station, storing the measurements in an internal log, and sending a notification to the first network node regarding the presence of logged measurements in order to enable the first network node to respond to the notification with a request for a logged measurement report.

This object is according to a second aspect of the invention achieved through a first mobile station for informing a first network node of a wireless communication network about the presence of logged measurements. The mobile station comprises:
a measurement performing unit for performing measurements concerning one or more connectivity aspects for the first mobile station in relation to the wireless communication network, the measurements being performed according to a reporting configuration for the first mobile station, and
a control unit that
  orders the measurements to be performed, stores the measurements in an internal log, and orders a transmitter to send a notification to the first network node regarding the presence of logged measurements in order to enable the first network node to respond to the notification with a request for a logged measurement report.

The object is according to a third aspect of the invention achieved through a computer program product for informing a first network node of a wireless communication network about the presence of logged measurements. The computer program product comprises computer readable storage medium comprising a set of instructions causing a control unit in a mobile station to
order measurements concerning one or more connectivity aspects to be performed in and for the first mobile station in relation to the wireless communication network, the measurements being performed according to a reporting configuration for the first mobile station, store the measurements in an internal log, and order a transmitter to send a notification to the first network node regarding the presence of logged measurements in order to enable the first network node to respond to the notification with a request for a logged measurement report.

The invention has many advantages. Through sending an indication, the reliability in the reporting is increased. The risk of losing a measurement report is lowered. It also enables the network to only request reports when these are available. The network does not have to keep track of the presence of logged measurements and can therefore use its processing capability for other activities.

According to a variation of the invention a notification is repeatedly being sent if no request is received.

According to a further variation of the invention logged measurements are retained in the internal log if no request is received.

According to yet another variation of the invention the collection of measurements is performed in idle mode.

According to a further variation of the invention, the notification comprises an indication of type of access technology used by the first mobile station when gathering data for the report.

According to another variation of the invention, the notification is sent as a radio resource control message, which can be a modified message relating to the connection of a mobile station to the network. The message can especially be a radio resource control connection setup complete message.

According to one variation of the first aspect of the invention, the method further comprises the step of determining a point in time when to send the notification based on at least one notification timing criterion.

The notification timing criterion can be based on one or more of the following properties: mobile station memory consumption, battery level, availability of measurements and load in network.

According to one variation of the first aspect of the invention, the method further comprises receiving the reporting configuration from a network node.

According to one variation of the second aspect, the control unit of the mobile station is further arranged to receive the reporting configuration from a network node.

This network node providing the reporting configuration can be the first network node. As an alternative it can be a further network node, where the first and further network nodes use different types of access technology.

Another object of the invention is to enable, by a wireless communication network, a mobile station to provide logged measurement reports to a network node in a reliable way.

This object is according to a fourth aspect of the invention achieved through a method of enabling a mobile station to inform a first network node of the wireless communication network of the presence of logged measurements, the method comprising providing, from a network node, a first mobile station with a reporting configuration for sending logged measurement reports in order to enable the mobile station to send a notification to the first network node regarding the presence of logged measurements.

This object is according to a fifth aspect of the invention achieved through a network node of a wireless communication network for enabling a first mobile station to inform a first network node of the wireless communication network of the presence of logged measurements, the network node comprising a control processor arranged to provide the first mobile station with a reporting configuration for enabling the mobile station to send a notification to the first network node regarding the presence of logged measurements.

This object is according to a sixth aspect of the invention furthermore achieved through a computer program product for enabling a mobile station to inform a first network node of the wireless communication network of the presence of logged measurements, the computer program product comprising a computer readable storage medium comprising a set of instructions causing a network node in the network to:
provide a first mobile station with a reporting configuration for enabling the mobile station to send a notification to the first network node regarding the presence of logged measurements.

The reporting configuration can here specify that the first mobile station shall perform measurements when in idle mode.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

Figure 1:
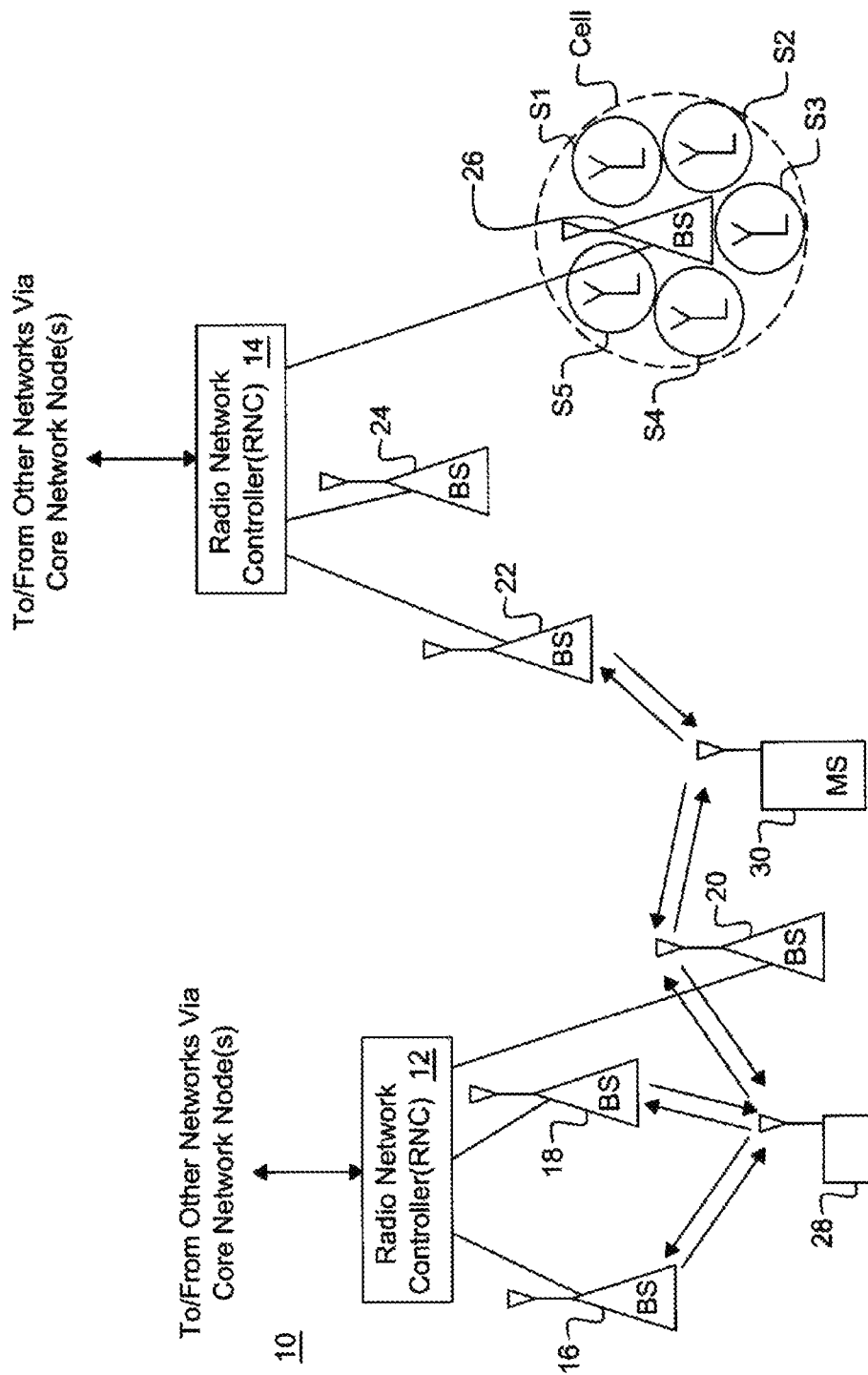
FIG. 1 schematically shows an architecture of a wireless communication network comprising radio network controllers, base stations and mobile stations.

In the following description, for purposes of explanation and not limitation, specific details are set forth such as particular architectures, interfaces, techniques, etc. in order to provide a thorough understanding of the invention. However, it will be apparent to those skilled in the art that the invention can be practiced in other embodiments that depart from these specific details. In other instances, detailed descriptions of well-known devices, circuits, and methods are omitted so as not to obscure the description of the invention with unnecessary detail.

The Third Generation Partnership Project (3GPP) Long Term Evolution (LTE) standard for wireless communication systems has recently been finalized, supporting bandwidths up to 20 megahertz (MHz). LTE and High-Speed Packet Access (HSPA) are sometimes called "third generation" (3G) communication systems and are currently being standardized by the 3GPP. The LTE specifications can be seen as an evolution of the current wideband code division multiple access (WCDMA) specifications.

An LTE system uses orthogonal frequency division multiplex (OFDM) as a multiple access technique (called OFDMA) in the downlink (DL) from system nodes to user equipments (UEs). UE is the term used for mobile stations in LTE and WCDMA. An LTE system has channel bandwidths ranging from about 1.4 MHz to 20 MHz, and supports throughputs of more than 100 megabits per second (Mb/s) on the largest-bandwidth channels. One type of physical channel defined for the LTE downlink is the physical downlink shared channel (PDSCH), which conveys information from higher layers in the LTE protocol stack and to which one or more specific transport channels are mapped. Control information is conveyed by a physical uplink control channel (PUCCH) and by a physical downlink control channel (PDCCH). LTE channels are described in 3GPP Technical Specification (TS) 36.211 V9.1.0, Physical Channels and Modulation, among other specifications, which are here incorporated by reference.

An IMT-Advanced communication system uses an internet protocol (IP) multimedia subsystem (IMS) of an LTE, HSPA, or other communication system for IMS multimedia telephony (IMT). In the IMT advanced system (which may be called a "fourth generation" (4G) mobile communication system), bandwidths of 100 MHz and larger are being considered. The 3GPP promulgates the LTE, HSPA, WCDMA, and IMT specifications, and specifications that standardize other kinds of cellular wireless communication systems.

In an OFDMA communication system, the data stream to be transmitted is portioned among a number of narrowband subcarriers that are transmitted in parallel. In general, a resource block devoted to a particular UE is a particular number of particular subcarriers used for a particular period of time. Different groups of subcarriers can be used at different times for different users. Because each subcarrier is narrowband, each carrier experiences mainly flat fading, which makes it easier for a UE to demodulate each subcarrier. OFDMA communication systems are described in the literature, for example US 2008/0031368, which is herein incorporated by reference.

FIG. 1 depicts the architecture of a WCDMA system 10, which is a typical cellular communication system. Radio network controllers (RNCs) 12, 14 control various radio network functions, including for example radio access bearer setup, diversity handover, etc. In general, each RNC directs calls to and from a UE, such as a mobile station (MS), mobile phone, or other remote terminal, via appropriate base station(s) (BSs), which communicate with each other through downlink (DL, or forward) and uplink (UL, or reverse) channels. In FIG. 1, RNC 12 is shown coupled to BSs 16, 18, 20, and RNC 14 is shown coupled to BSs 22, 24, 26. The architecture of an LTE system differs from that of a WCDMA system in that the RNC is lacking as a separate node. Instead, the BS, or eNodeB as is the name of the LTE radio base station, has some of the functions of the RNC integrated, and has an interface for communication with other eNodeBs.

Each BS, or eNodeB in an LTE system, serves a geographical area that is divided into one or more cell(s). In FIG. 1, BS 26 is shown as having five antenna sectors S1-S5, which may be said to make up the cell of the BS 26, although a sector or other area served by signals from a BS can also be called a cell. In addition, a BS can use more than one antenna to transmit signals to a UE. The BSs are typically coupled to their corresponding RNCs by dedicated telephone lines, optical fiber links, microwave links, etc. The RNCs 12, 14 are connected with external networks such as the public switched telephone network (PSTN), the internet, etc. through one or more core network nodes, such as a mobile switching center (not shown) and/or a packet radio service node (not shown).

It will be understood that the arrangement of functionalities depicted in FIG. 1 can be modified in 3G LTE and other communication systems. For example, the functionality of the RNCs 12, 14 can be moved to the eNodeBs 22, 24, 26, and other functionalities can be moved to other nodes in the network. It will also be understood that a base station can use multiple transmit antennas to transmit information into a cell/sector/area, and those different transmit antennas can send respective, different pilot signals.

Figure 2:
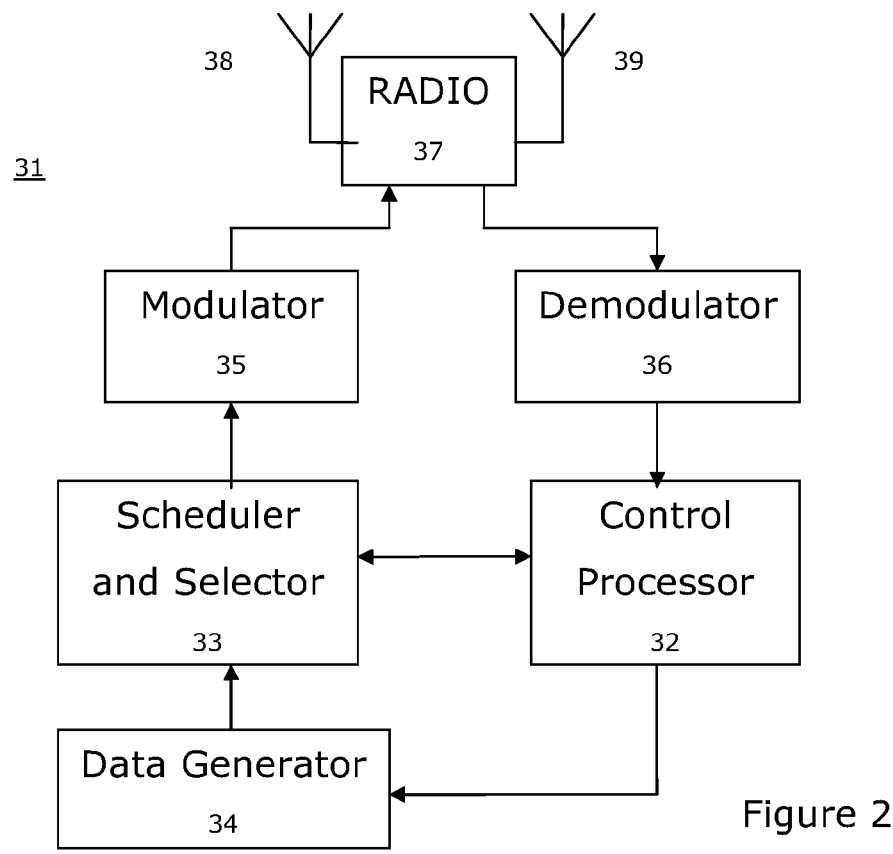
FIG. 2 shows a block diagram of an arrangement in a mobile station that can implement some of the functionality according to the invention.

FIG. 2 is a block diagram of a structure 31 of an eNodeB or eNB, i.e. of a base station BS. This structure 31 which is typical of the BSs 16, 18, 20, 22, 24, 26 and other such transmitting nodes in the network 10 can be used for communicating with mobile stations by implementing the methods to be described below. It will also be appreciated that the functional blocks depicted in FIG. 2 can be combined and re-arranged in a variety of equivalent ways, and that many of the functions can be performed by one or more suitably programmed digital signal processors and other known electronic circuits.

The eNB structure 31 is operated by a control processor 32, which typically and advantageously is a suitably programmed digital signal processor. The control processor 32 typically provides and receives control and other signals from various devices in the structure 31. For simplicity in FIG. 2, the control processor 32 is as shown exchanging information with a scheduler and selector 33, which receives digital words to be transmitted to respective mobile stations or to be broadcast from a suitable data generator 34. The scheduler and selector 33 implements resource block and resource element (RB/RE) scheduling and selection in an LTE system, for example, and implements code allocation in a WCDMA/HSPA system, for example.

The control processor 32 is configured to monitor the load on the base station, which can be determined for example simply by counting the RBs and REs to be transmitted in a sub-frame, frame, or group of them. A processor such as the control processor 32 can also be configured as a traffic analyzer that determines the load on a BS by monitoring the BS buffer status, e.g., how much data is waiting for available bandwidth to be transmitted to all connected mobile stations in relation to the number of RBs and REs being and recently transmitted. As discussed above, the load on a BS can also be determined based on the number of its connected mobile stations, or in a WCDMA, HSPA, or equivalent system, based on the number of allocated channelization codes. Based on the determined load, the processor 32 implements other steps of the methods to be described below.

Information from the scheduler and selector 33 is provided to a modulator 35 that uses the information to generate a modulation signal suitable for the particular communication system. For example, the modulator 35 in an LTE system is an OFDM modulator. The modulation signal generated by the modulator 35 is provided to a suitable radio circuit 37 that generates a wireless signal that is transmitted through at least one transmit antenna 38. Wireless signals transmitted by mobile stations are captured by at least one receive antenna 39 that provides those signals to the radio circuit 37 and a demodulator 36. The artisan will understand that the same antenna can be used for transmission and reception, as is often done in a UE.

It will be understood that the control processor 32 can be configured such that it includes one or more other devices depicted in FIG. 2, which can be implemented by dedicated programmed processors or other suitable logic configured to perform their functions. The combination of the data generator 34, scheduler and selector 33, and modulator 35 produces DL frames or sub-frames to be transmitted. The modulator 35 converts the information into modulation symbols that are provided to the radio circuit 37, which impresses the modulation symbols on one or more suitable carrier signals. In an LTE system for example, the radio circuit 37 impresses the modulation symbols on a number of OFDM subcarriers. The modulated subcarrier signals are transmitted through the antenna 38.

Figure 3:
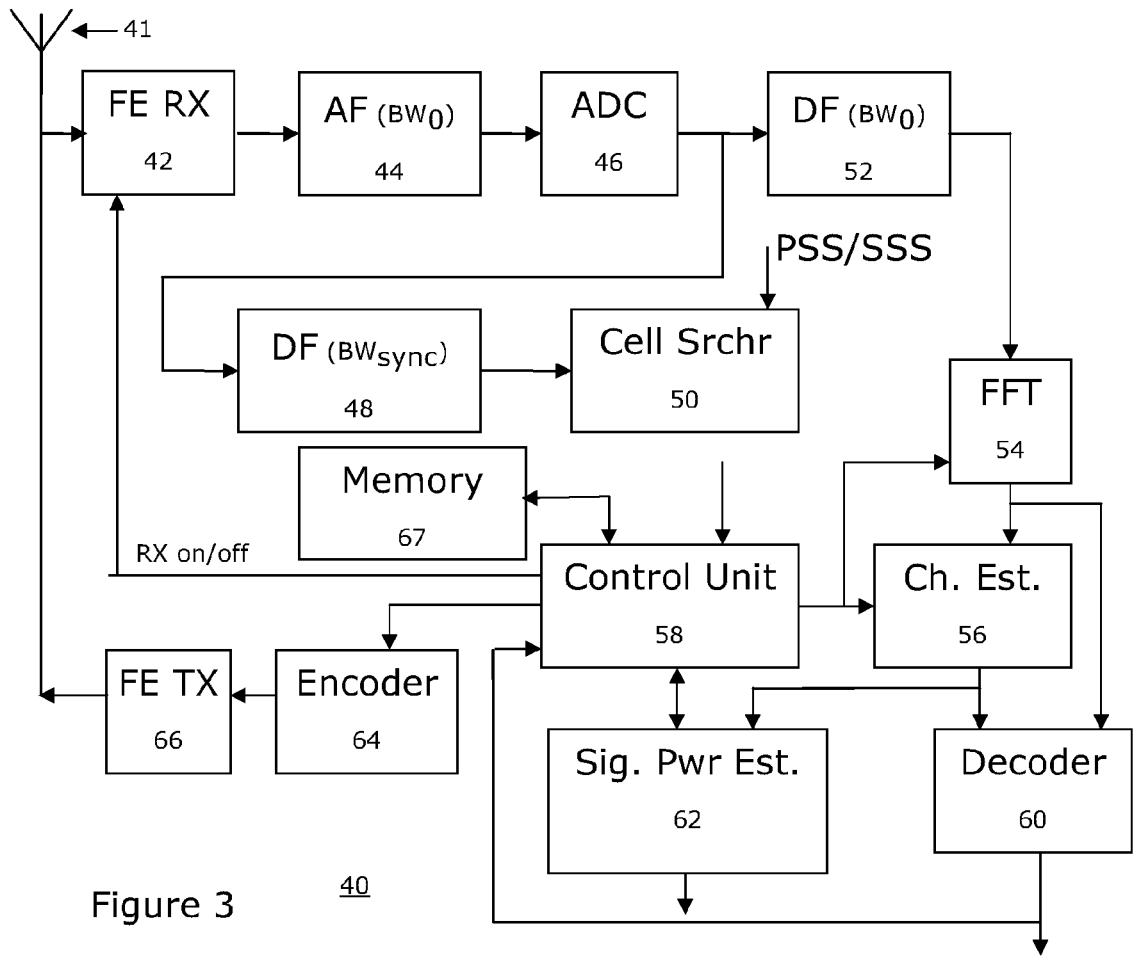
FIG. 3 shows a block diagram of a portion of a base station that can communicate with mobile stations and implement some of the functionality according to the invention, FIG. 4 schematically shows signals exchanged between a mobile station and network in a first basic variation of the invention.

FIG. 3 is a block diagram of an arrangement 40 in a mobile station that can implement methods of various embodiments of the invention to be described below. It will be appreciated that the functional blocks depicted in FIG. 3 can be combined and re-arranged in a variety of equivalent ways, and that many of the functions can be performed by one or more suitably programmed digital signal processors. Moreover, connections among and information provided or exchanged by the functional blocks depicted in FIG. 3 can be altered in various ways to enable a mobile station to implement other methods involved in the operation of the mobile station.

As depicted in FIG. 3, a mobile station receives a DL radio signal through an antenna 41 and typically down-converts the received radio signal to an analog baseband signal in a front end receiver (Fe RX) 42. The baseband signal is spectrally shaped by an analog filter 44 that has a bandwidth $BW_0$, and the shaped baseband signal generated by the filter 44 is converted from analog to digital form by an analog-to-digital converter (ADC) 46.

The digitized baseband signal is further spectrally shaped by a digital filter 48 that has a bandwidth $BW_{sync}$, which corresponds to the bandwidth of synchronization signals or symbols included in the DL signal. The shaped signal generated by the filter 48 is provided to a cell search unit 50 that carries out one or more methods of searching for cells as specified for the particular communication system, e.g., 3G LTE.

Typically, such methods involve detecting predetermined primary and/or secondary synchronization channel (P/S-SCH) signals in the received signal.

The digitized baseband signal is also provided by the ADC 46 to a digital filter 52 that has the bandwidth $BW_0$, and the filtered digital baseband signal is provided to a processor 54 that implements a fast Fourier transform (FFT) or other suitable algorithm that generates a frequency-domain (spectral) representation of the baseband signal. A channel estimation unit 56 receives signals from the processor 54 and generates a channel estimate $H_{i,j}$ for each of several subcarriers i and cells j based on control and timing signals provided by a control unit 58, which also provides such control and timing information to the processor 54.

The estimator 56 provides the channel estimates $H_i$ to a decoder 60 and a signal power estimation unit 62. The decoder 60, which also receives signals from the processor 54, is suitably configured to extract information from radio resource control (RRC) messages or other messages as described below and typically generates signals subject to further processing in the mobile station (not shown). The estimator 62 generates received signal power measurements (e.g., estimates of reference signal received power (RSRP), received subcarrier power $S_i$, signal to interference ratio (SIR), etc.). The estimator 62 can generate estimates of RSRP, reference signal received quality (RSRQ), received signal strength indicator (RSSI), received subcarrier power $S_i$, SIR, and other relevant measurements, in various ways in response to control signals provided by the control unit 58. Power estimates generated by the estimator 62 are typically used in further signal processing in the mobile station. The estimator 62 and channel estimation unit 56 can both be measurement providing units of the invention.

The estimator 62 (or the searcher 50, for that matter) is configured to include a suitable signal correlator.

In the arrangement depicted in FIG. 3, the control unit 58 keeps track of substantially everything needed to configure the searcher 50, processor 54, estimation unit 56, and estimator 62. For the estimation unit 56, this includes both method and cell identity (for reference signal extraction and cell-specific scrambling of reference signals). Communication between the searcher 50 and the control unit 58 includes cell identity and, for example, cyclic prefix configuration.

The control unit 58 can determine which of several possible estimation methods is used by the estimator 56 and/or by the estimator 62 for measurements on the detected cell(s). In addition, the control unit 58, which typically can include a correlator or implement a correlator function, can receive information signaled by the network and can control the on/off times of the Fe RX 42.

The control unit 58 provides appropriate information to an encoder 64, which generates modulation symbols or similar information that is provided to a transmitter front-end (FE TX) 66, which generates a transmission signal appropriate to the communication system. As depicted in FIG. 3, the transmission signal is provided to the antenna 41. The control unit 58 with the encoder 64 is suitably configured to generate RRC and other messages sent by the mobile station to the network as described below. Finally there is a memory 67 connected to the control unit 58 in order to store measurement logs.

The control unit 58 and other blocks of the mobile station can be implemented by one or more suitably programmed electronic processors, collections of logic gates, etc. that processes information stored in one or more memories. As noted above, the mobile station includes the memory 67. As an alternative it can include some other type of information storage functionality. The memory 67 or other type of information storage functionality is suitable for carrying out the methods and receiving and generating the signals to be described below in cooperation with the control unit 58 and software executed by the control unit. For example, the memory can be used to collect data for Minimizing of Drive Tests (MDT) under the control of the control unit 58 and possibly other electronic processor(s) in the mobile station and to deliver the data to the network according to software executed by the control unit(s) and information and/or requests received from the network. The stored information can include program instructions and data that enable the control unit 58 to implement the methods to be described below. It will be appreciated that the control unit typically includes timers, etc. that facilitate its operations.

Figure 4:
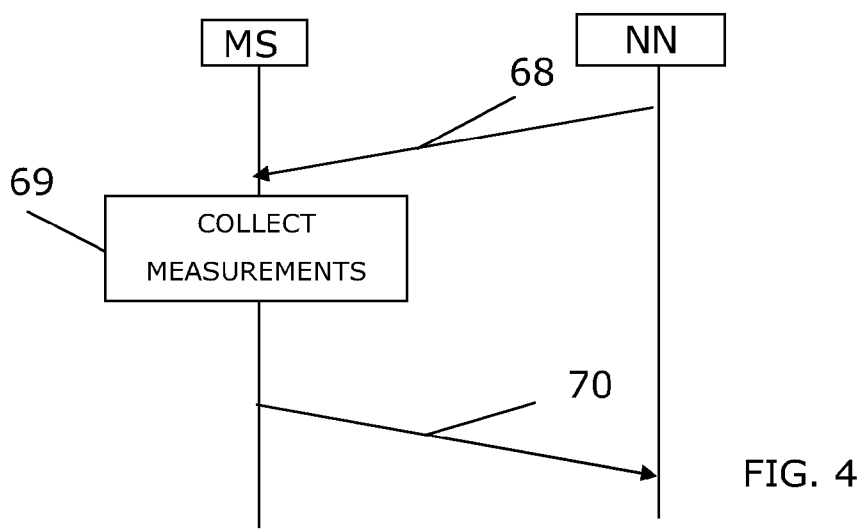

Now a first basic variation of the invention will be described with reference also being made to FIG. 4, which shows signals exchanged between a first mobile station MS and a first network node NN, where the first network node can be a base station or a radio network controller.

As mentioned earlier the invention is provided for controlling the reporting, here non-real time reporting, of measurements from a mobile station to a network node.

At a minimum, control of non-real-time reporting can comprise configuration of measurements to be logged, triggering of logging events, and reporting of logs. FIG. 4 shows a schematic picture of a non-real-time measurement procedure. Note that the network node NN or network node entity can be either a base station such as an eNB or a radio network controller (RNC), depending on access technology. In both cases the node will typically use the structure 31 depicted in FIG. 2.

Initially the first network node (for instance either eNB or RNC) configures the non-real-time measurements. The first network node thus sends a configuration of non-real time measurements to the first mobile station, step 68. The measurements can apply for a mobile station being either connected using radio resource control (RRC) or being in RRC idle mode. The configuration of the mobile station can be done or carried out using dedicated signaling when the mobile station is in connected mode even though the actual measurements can be performed in RRC idle mode, or can be done or carried out with broadcast of system information, in which case it is expected that the mobile station, when in idle mode reads the system information directly. The configuration can be sent in a dedicated RRC message, logged measurement configuration. The configuration typically sets out measurements to be made by the mobile station concerning one or more connectivity aspects in and for the first mobile station in relation to the first communication network, which connectivity aspects can include one or more of the following: measurement object (e.g. frequency and/or Radio Access Technology (RAT) that the mobile station is supposed to measure), reporting quantity (e.g. Reference Signal Received Power (RSRP) or Reference Signal Received Quality (RSRQ), measurement type (e.g. periodical or event triggered). The control processor 32 can here provide configuration data to the scheduler and selector 33, which in turn treats the data through performing resource block and resource element scheduling and selection or code allocation depending on type of network. The configuration can also include a timer or timer value indicating for how long the configuration is valid. The configuration can thus only be in force a limited time. The treated data is then modulated by the modulator 35 onto a suitable carrier, which is then transmitted as a wireless signal by the radio circuit 37 via the antenna 38. In this way it can be seen that the control processor is arranged to provide the first mobile station with the reporting configuration.

The configuration is then received by the control unit 58 of the mobile station, for instance mobile station 28. The configuration can here be received via the antenna 41, front-end receiver 42, analog filter 44, ADC 46, digital filter 52, processor 54 and decoder 60.

When the mobile station MS has received the configuration it performs measurements according to the received measurement configuration and stores the measurement results in the mobile station internal log. It thus collects measurements according to the configuration, step 69. The measurements can be collected or gathered through the control unit 58 ordering a measurement performing unit, such as estimator 62, to perform measurements according to the configuration. The measurement performing unit then performs measurements and sends these to the control unit 58. When receiving measurements, the control unit 58 then stores these in an internal log in the memory 67.

After having been collected, the logged measurements are delivered to the network node entity. The mobile station thus performs reporting of the non-real-time measurements, step 70. Two alternative ways of reporting logged measurements will be described later.

Typically reporting is made through the control unit 58 providing data to the encoder 64 for modulation and thereafter to the transmitter front-end 66 for transmission via the antenna 41. It can thus be seen that the control unit 58 orders the transmitter front-end to send the report.

It should here be realized that the reporting of non-real-time measurements can not necessarily correspond to the same network node as the configuration of the measurements. For example, the measurements can be configured using an eNB, but the reporting can be made to RNC, i.e. a mobile station can use a different RAT to report the logged measurements than the one it received the configuration from.

As a further variation of this general concept it is possible that a mobile station is pre-configured, i.e. it is provided with the configuration beforehand and would therefore not need to receive it from the network.

Figure 5:
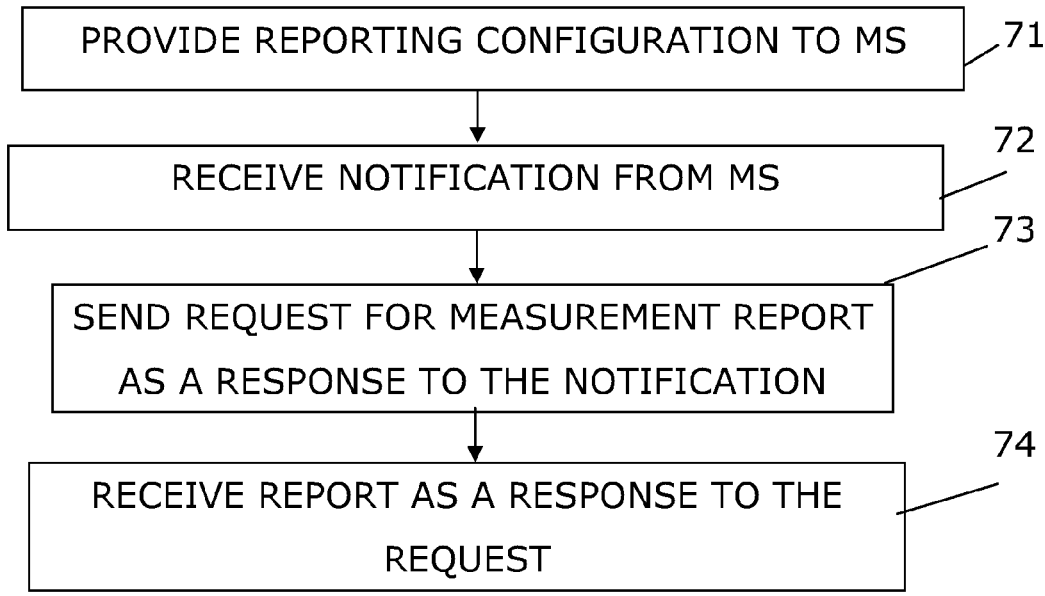
FIG. 5 shows a flow chart of a number of method steps being performed in a network node of the system according to a first embodiment of the invention.
Figure 6:
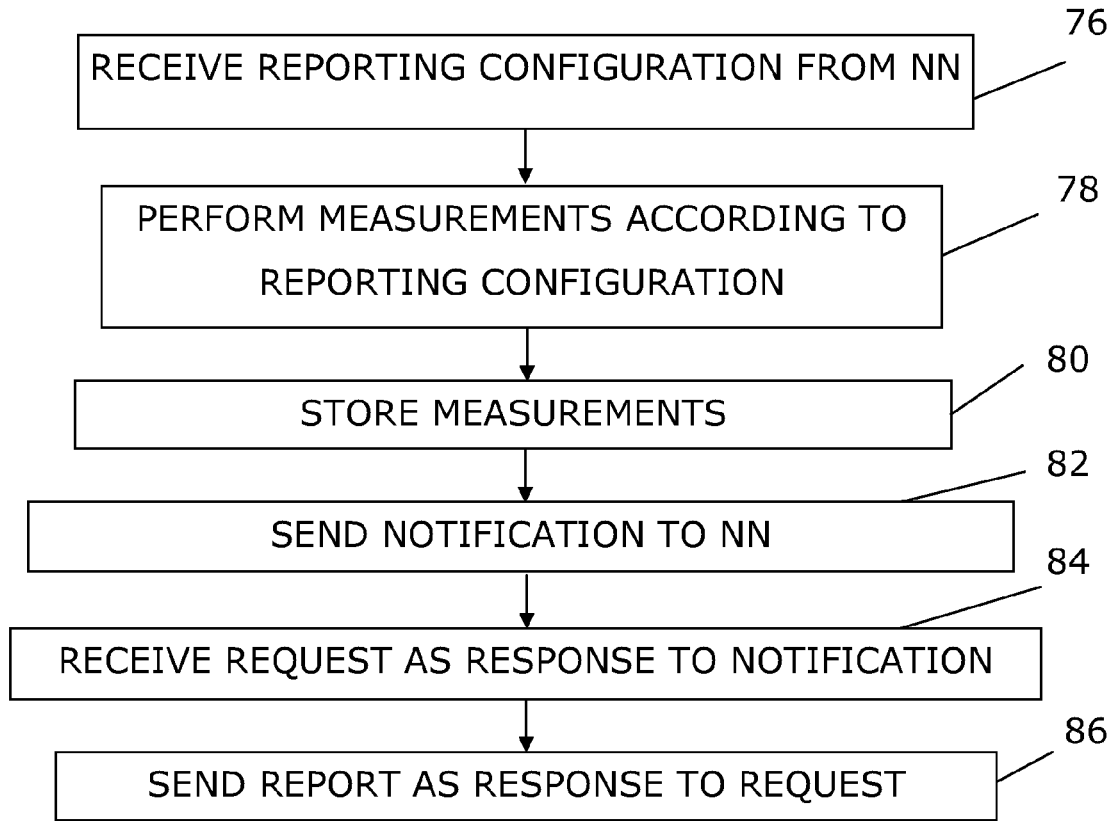
FIG. 6 shows a flow chart of a number of method steps being performed in a mobile station according to the first embodiment of the invention, FIG. 7 schematically shows signals exchanged between mobile station and network node in a variation of the first embodiment.

Now a first embodiment of the invention will be described in more detail with reference also being made to FIG. 5, which shows a flow chart of a number of method steps being performed in a network node in the form of a base station or radio network controller and to FIG. 6, which shows a flow chart of a number of corresponding method steps being performed in a mobile station.

In this first embodiment the first network node, for instance the base station 16, provides a reporting configuration to a mobile station MS, for instance the first mobile station 28, step 71. This reporting configuration is provided to the first mobile station in order to enable the network to send a request for a logged measurement report to the first mobile station and receive such a report as a response. The configuration can set out what parameters are to be measured, when measurements are to be made and how reporting is to be made. The reporting configuration can also specify that the mobile station is to perform measurements when in idle mode. This reporting configuration is thus sent to the mobile station 28. It can more particularly be performed in the same way as was described above in relation to the first basic variation of the invention in an RRC message named logged measurement configuration.

The mobile station thus receives such a reporting configuration from the network node, step 76, and then performs measurements according to this reporting configuration, step 78. The measurements can with advantage be performed in idle mode. As measurements are performed they are then being stored in an internal measurement log, step 80. This measurement log can be provided through the memory 67 connected to the control unit 58 of the mobile station. In this way data is gathered in the log. At a suitable time, which time can be set by the reporting configuration or the selection of which can be set by the reporting configuration, a notification is then sent to the first network node from the first mobile station, step 82. The notification is a notification of the presence of logged measurements and perhaps also of the presence of a logged measurement report and is sent in order to enable the first network node to respond to the notification with a request for a logged measurement report. The notification can be sent in an RRC message and therefore the control unit 58 can provide such a message to the encoder 64 for modulation and thereafter transmission by the transmitter front-end 66 via the antenna 41. In the first embodiment the first mobile station can first send an RRC Connection Request message to the first network node, which responds with an RRC Connection Setup message. Thereafter the first mobile station can send an RRC Connection Setup Complete message. It is this latter message that can include a bit position, logged measurements available, that has been set.

The control processor 32 of the network node then receives the notification via the antenna 39, radio circuit 37 and demodulator 36. As the network node receives the notification from the mobile station, step 72, it thereafter sends a request for a logged measurement report as a response to the notification, step 73. It is here possible that such a request is only sent as a response to a notification. It is thus according to the first embodiment possible that a request for measurement is only sent if there is a prior notification. It can thus only be sent based on the reception of a notification from the first mobile station. In this first embodiment it is furthermore the same network node that provides the configuration and sends the request for a measurement report. The request can be sent in the form of an RRC message provided to the scheduler and selector 33 from the control processor 32 for being treated, for instance code allocation in WCDMA. Thereafter the treated data is modulated by the modulator 35 and transmitted to the mobile station via the antenna 38. In this way it can be seen that the control processor 32 is arranged to cause the sending of the request. The request is in the first embodiment sent in a RRC UE Information Request message. Here it is possible to use a bit position or variable in this message named LogMeasReportRequest.

The mobile station then receives the request as a response to the notification, step 84. The request is received in the control unit 58 via antenna 41, front-end receiver 42, analog filter 44, ADC 46, digital filter 52, processor 54 and decoder 60. The control unit 58 then sends the report as a response to the request, step 86. It is here possible that such a report is only sent as a response to a request. It is thus according to the first embodiment possible that a report is only sent if there is a prior request for measurements. In this first embodiment the report is then sent as soon as it is possible. The report is sent using the encoder 64, transmitter front-end 66 and antenna 41. The reporting is in the first embodiment sent in an RRC UE information response message in a section named LogMeasReport.

The network node then receives the logged measurement report as a response to the request, step 74, which report can be received in the same way as the notification. The control processor is thus arranged to receive the logged measurement report as a response to the request. The node can then perform a suitable activity such as change its coverage based on one or more such reports received from various mobile stations.

Here it is also possible that measurements are made and also that reporting is made before a complete configuration has been received. The mobile station can for instance start the previously mentioned timer and then perform collection of measurements in idle mode, periodically or event-triggered. Then as soon as it enters connected state, it can notify the network of available logged measurements. These can be reported upon receiving a request from the network. If the mobile station then again enters idle mode, it can again continue to perform measurements according to the configuration. The performing of measurements can then end when the timer value expires and a final measurement report being notified and possibly also being sent the next time the mobile stations gets connected. It is here further possible to later receive a new configuration.

Figure 7:
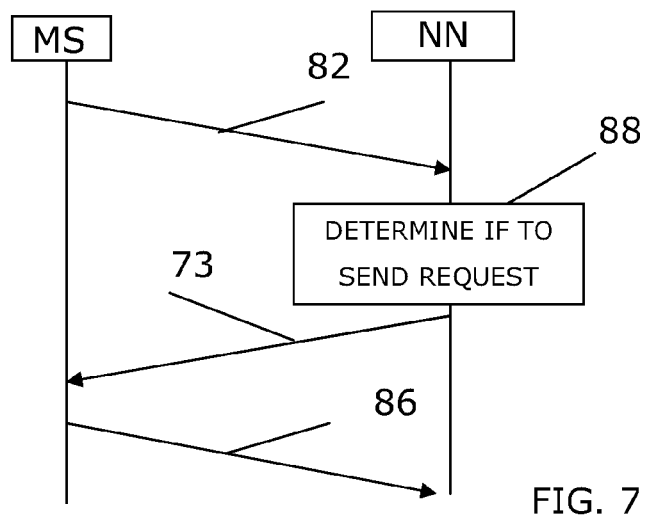

FIG. 7 shows some signals sent between mobile station and network node in one variation of this first embodiment.

In this variation, the mobile station indicates the availability of logged measurements to the network, through sending a notification to the network node, step 82.

If the mobile station has performed the measurements in idle mode, the indication can be done as a part of an RRC connection setup procedure. It can be a modified RRC message relating to the connection of a mobile station to the network. As such it can be an RRC Connection Request or RRC Connection Setup Complete message. As an alternative it is possible to use a special RRC message. This means that the indication can be provided in an RRC Connection Request message, an RRC Connection Setup Complete message, an RRC Connection Reconfiguration Complete message or an RRC Connection Reestablishment Complete message, for instance through an additional bit position provided for this purpose in these messages. This can be a bit position or variable named logMeasAvailable. It is also possible to create a new type of RRC message that is dedicated to notification. Other types of possible messages are Cell Update, URA Update, Handover To UTRAN Complete and UTRAN Mobility Information Confirm Measurement Report. As an alternative it is possible to provide the indication in an UE Information Response message. If the mobile station has performed measurements in RRC Connected Mode, a special RRC message (e.g. UE Information Indication) or an extension of a current RRC message (e.g. Measurement Report, UECapabilityInformation) can be used. In the first embodiment the message RRC Connection Setup Complete is used. If the network node does not support reception of non-real-time measurements, it will simply ignore the indication from the mobile station. Note that the timing of the indication can be determined by the mobile station based on at least one notification timing criterion. This criterion can be a criterion based on one of mobile station memory consumption, battery level or some other factor. Note also that the indication from the mobile station can include an indication on which technology or RAT (e.g. HSPA, LTE, cdma2000, etc.) the measurements were collected via. The indication can include an indication of type of access technology used by the first mobile station when gathering data for the report. The first network node can use this information to determine if it can receive the particular measurements (e.g. is capable of decoding the Abstract Syntax Notation One (ASN.1) format used for measurement report).

The first network node then determines if it should request logged measurements, i.e. it determines if it should send a request for measurements based on at least one reporting timing criterion, step 88. If the network node supports reception of the non-real-time measurements, which it would normally do when configuring the mobile station, it can use the current load in the cell, current load in the system, connection to the centralized data base to store reports and various other factors to determine a suitable time instance to request the mobile station to transmit a measurement log. The reporting timing criterion can thus be based on one or more of the properties load in the cell, load in the system and connection to the centralized data base. The request is then sent, step 73. The request to the mobile station can be sent using a special RRC message, or by using an existing RRC message. The request can be sent in a radio resource control message concerning the capabilities if the mobile station, such as ueCapabilityEnquiry or ueInformationRequest. In the first embodiment the message ueInformationRequest is used.

Finally the mobile station, upon receiving the request to transmit non-real-time measurement data, will transmit the logged measurements to the network node entity, step 86. The transmission can be done using a special RRC message, or by using an existing RRC message (e.g. ueCapabilityResponse, MeasurementReport). In the first embodiment the message ueInformationResponse is used, which is a response to the radio resource control message comprising the request.

If the mobile station has data available and has reported the data as available for transmission, but has not received a request to transmit logged measurements, it can repeat sending the indication either periodically, or after it has moved to a difference cell. This also means that logged measurements and a logged report can be retained in the internal log, and thus no report sent, if no request is received.

As a further variation of the first embodiment it is possible that in order to avoid congesting signaling radio bearers (SRBs) with large measurement logs, a special SRB for non-real-time measurement reports can be used. This means that the report can be transmitted on a signaling radio bearer dedicated to transmissions of logged measurement reports.

As yet another variation of the first embodiment it is also possible to omit the indication from the mobile station completely. In such a solution, the network and more particularly the network node can simply ask different mobile stations to provide logged measurements based on information available in the network. For example, if the mobile station capabilities (e.g. if the mobile station is in RRC Connected mode and has indicated that it supports non-real-time measurements) are known in the network, for instance by the first network node, the network can simply ask the mobile station to provide any logged measurements (including measurements logged earlier in Idle mode).

After the network and here the first network node has received an indication that the mobile station has logged measurements available, or has otherwise determined that the mobile station might have logged measurements available, the network selects a suitable occasion to request the logged measurements from the mobile station. If the network entity doing this, here the first network node, does not support reception of the non-real-time measurements, it will never request the logged measurements from the mobile station.

Figure 8:
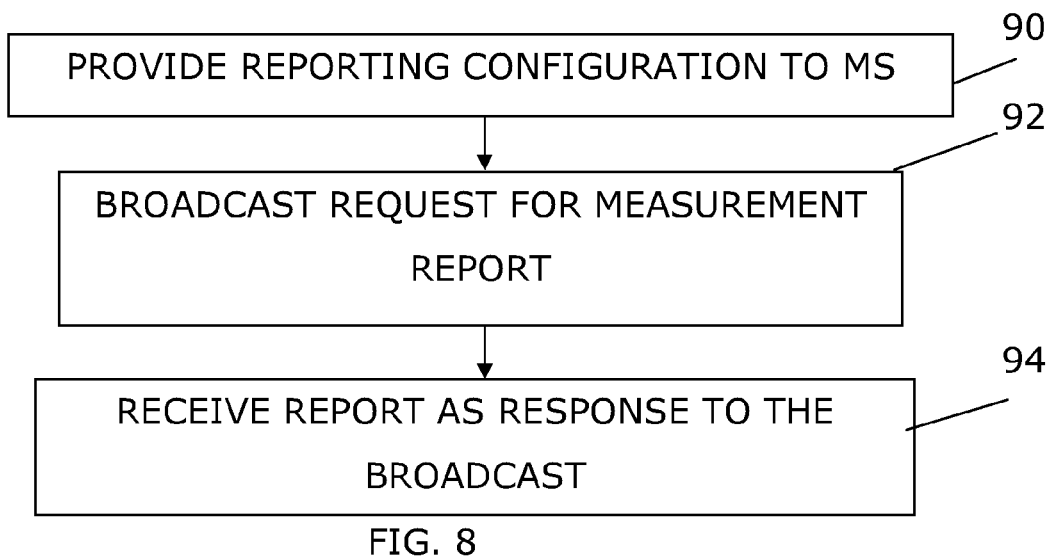
FIG. 8 shows a flow chart of a number of method steps being performed in a network node of the system according to a second embodiment of the invention.
Figure 9:
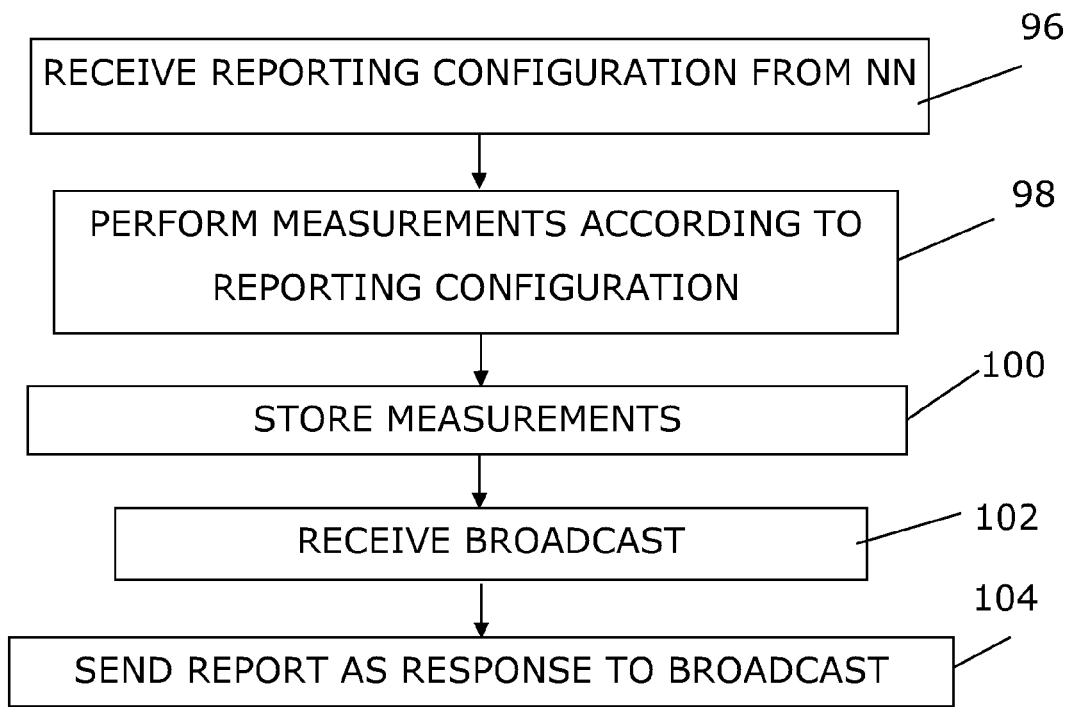
FIG. 9 shows a flow chart of a number of method steps being performed in a mobile station according to the second embodiment of the invention, FIG. 10 schematically shows signals exchanged between mobile station and network in a variation of the second embodiment.

It is possible to omit notifications in other scenarios. It is for instance possible to use broadcasting by the network instead. This is done in a second embodiment of the invention. The second embodiment of the invention will now be described with reference being made to FIG. 8, which shows a flow chart of a number of method steps being performed in a network node in the form of a base station or radio network controller and to FIG. 9, which shows a flow chart of a number of corresponding method steps being performed in a mobile station.

In this second embodiment one network node, for instance the base station 16, provides a reporting configuration for a mobile station MS, for instance the first mobile station 28, step 90, through transmitting the configuration to the mobile station. The mobile station then receives the reporting configuration from the network node, step 96, and thereafter performs measurements according to this reporting configuration, step 98. The measurements can also here with advantage be performed in idle mode. As measurements are performed they are then being stored in a measurement log, step 100. So far the second and first embodiments operate in the same way.

However, now in the second embodiment there is no notification. Instead the first network node broadcasts a request for measurement reports to a group of mobile stations in its vicinity, which group includes the first mobile station, step 92. It thus sends a request for measurement reports in a broadcast, which can be seen as a request being sent to all mobile stations in its vicinity. This can be done through the control processor 32 ordering the data generator 34 to include the request in a broadcast being made. The data generator 34 can then include the request in the data to be broadcast, forward this data to the scheduler and selector 33 for treatment, followed by modulation of the treated data in the modulator 35 and transmission of the modulated and treated data by the radio circuit 37 via the antenna 38.

As a mobile station, like the first mobile station receives such a request in a broadcast, step 102, it then sends a report as a response to the broadcast. It is here possible that reports are only sent as such responses. This means that unless a broadcast with a request is received, no reports will be sent by the mobile station. The network node then receives the report as a response to the broadcast, step 94, and can then perform a suitable activity based on one or more such reports. The report is here typically received by the control processor 32 via the antenna 39, radio circuit 37 and demodulator 36.

Figure 10:
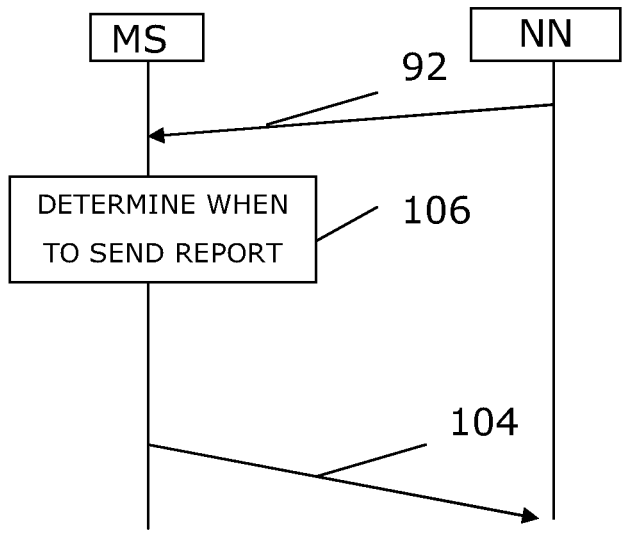

The signals exchanged between a network node and a mobile station in a variation of this second embodiment are schematically shown in FIG. 10.

Here the network, in the form of a base station, broadcasts the request, step 92. This can be done through the node broadcasts a cell level indication that the mobile station can transmit non-real-time measurement reports in a current cell. Note that the network entity can use the current load in the cell, current load in the system, connection to a centralized data base to store reports and various other factors to determine a suitable time instance to broadcast an indication for mobile stations to transmit measurement logs. The broadcast indication can be done using any existing System Information Message (MIB/SIB1) or System Information Block (SIB2-13) or using a new SIB or a new RRC message, i.e. a RRC message designed and dedicated to this purpose.

Upon receiving the broadcasted indication, step 102, the mobile station can determine a suitable time to report logged measurements, based on at least one report timing criterion, which criterion can be based on one or more of the properties mobile station memory consumption, battery level, availability of measurements, or by various other factors. It is also possible that the network, and here the first network node, can ask the mobile station to report the logged measurements immediately.

When the mobile station has determined a suitable time to transmit logged measurements, i.e. has determined when to send a report, step 106, (or if being ordered to report logged measurements immediately), the mobile station will transmit the logged measurements to the network entity, here the first network node. It will thus send the report to the network node as a response to the broadcast, step 104. The transmission can be done using a special RRC message, or by using an existing RRC message (e.g. ueCapabilityResponse, MeasurementReport)

It is also here possible to use a special SRB for non-real-time measurement reports in order to avoid congesting SRBs with large measurement logs.

Figure 11:
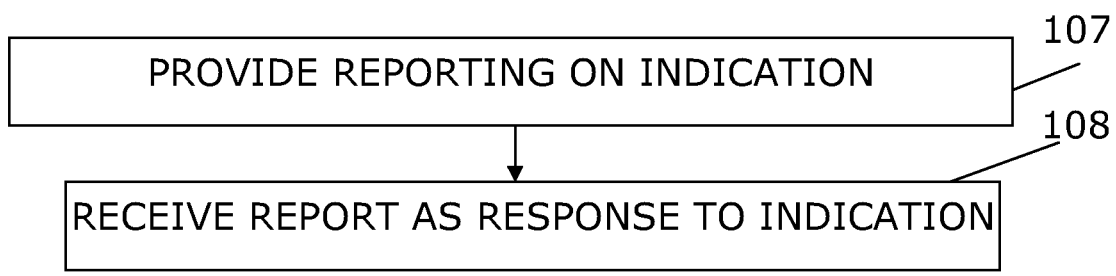
FIG. 11 shows a flow chart of a number of method steps being performed in a network node of the system according to a third embodiment of the invention.
Figure 12:
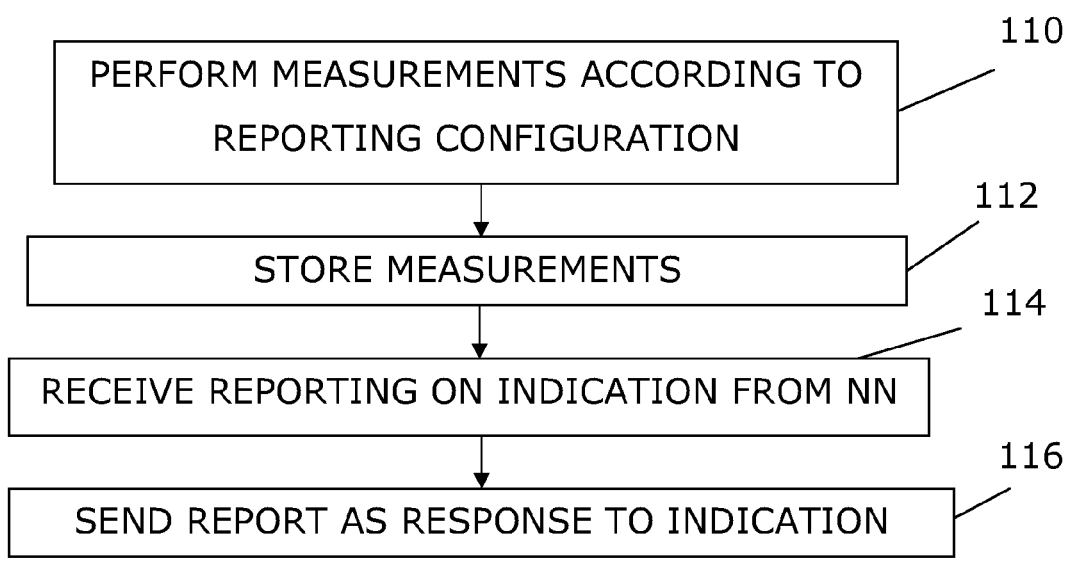
FIG. 12 shows a flow chart of a number of method steps being performed in a mobile station according to the third embodiment of the invention, and FIG. 13 schematically shows a computer program product according to the invention comprising a computer readable storage medium in the form of a CD ROM disc.

A third embodiment of the invention is also directed towards avoiding the use of indications. The third embodiment of the invention will now be described with reference being made to FIG. 11, which shows a flow chart of a number of method steps being performed in a network node in the form of a base station or radio network controller and to FIG. 12, which shows a flow chart of a number of corresponding method steps being performed in a mobile station.

In this third embodiment the mobile station performs measurements according to a reporting configuration that it has, step 110, which reporting configuration can have been received in the same way as described in the first and second embodiment or which can be provided in the mobile station beforehand. The measurements can also here with advantage be performed in idle mode. As measurements are performed they are then being stored in a measurement log, step 112.

In the third embodiment, the network controls the transmission of the non-real-time measurements by indicating Reporting ON/OFF. For example, the network can use an existing RRC message (e.g. in ueCapabilityEnquiry or SystemInformationBlock), a new dedicated RRC message, or a new broadcast message.

The first network node can thus provide a reporting on indication to a mobile station, step 107, through sending such a message.

Through receiving such a message, the mobile station thus receives a reporting on indication from the network node, step 114. Once the mobile station has received the Reporting ON indication, it can then send the report at corresponding cell at a suitable point of time, e.g. when the mobile station has no more memory available, periodically, when the mobile station leaves logging campaign. In this way the mobile station can send the report as a response to the reporting on indication.

This can later be followed by the network sending a reporting OFF indication, which can typically be done in the same way as a modification of any of the previously described messages. This will disable the reporting and therefore no reports will be sent in this case.

The present invention has a number of advantages. It enables the network to control the reporting of the logged measurements. Loss of logged measurements can be avoided if the network does not support the reception of non-real-time measurements. This further allows the network to perform a number of further activities such as changing of cell coverage. Furthermore, if the measurements are collected in idle mode, the communication over the wireless interface between base station and mobile station is not disturbed. Furthermore, through sending an indication, the reliability in the reporting is increased. The risk of losing a measurement report is lowered. It also enables the network to only request reports when these are available. The network does not have to keep track of the presence of reports and can therefore use its processing capability for other activities.

In some embodiments of the invention RRC messages were used. Such messages are described in more detail in 3GPP Technical Specifications 36.331 and 25.331, both of which are herein incorporated by reference.

There are many variations that can be made to the invention apart from those already mentioned. It is possible that different network nodes are used for performing configuration and receiving reports. A first network node can for instance send the request and a further network node can provide the configuration. In this case the first and further network nodes can use different types of access technology, i.e. different RATs. Then the configuration and request can be received by the first mobile station using these different types of access technology. It is here also possible that different access networks are used, where one network node in a first access network is used for configuration and another node in a second access network is used for receiving reports, where both access networks can be subnetworks of the same communication network. It is also possible that the nodes involved in providing configurations and/or receiving reports are nodes at higher hierarchical levels of the communication network. Such a node can for instance be a node in the core network, like a server in a core network. One example is a Mobility Management Entity (MME) server or an Operations and Maintenance (O&M) server. The invention was above described in relation to MDT and logged measurement reporting. However, it should be realized that the invention is not limited to this specific area. The sending of notifications and reporting can for example also be performed in relation to Automatic Neighbor Relations (ANR).

Furthermore in the description given earlier the control processor performing the network activities of the invention was in essence a base station. If the node is another node in the network, this node would also be provided with a control processor, for instance a master control processor, communicating with the control processor of the base station, a slave control processor. Such communication can be performed using a suitable network communication interface such as the S1 communication interface in LTE. The slave control processor would then perform the above-described functionality under the control of the master control processor.

It will be appreciated that the methods and devices described above can be combined and re-arranged in a variety of equivalent ways, and that the methods can be performed by one or more suitably programmed or configured digital signal processors and other known electronic circuits (e.g., discrete logic gates interconnected to perform a specialized function, or application-specific integrated circuits). Many aspects of this invention are described in terms of sequences of actions that can be performed by, for example, elements of a programmable computer system. UEs embodying this invention include, for example, mobile telephones, pagers, headsets, laptop computers and other mobile terminals, and the like. Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions.

Figure 13:
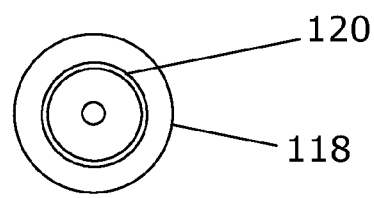

The control of the mobile station and/or the control processor of the base station radio network controller can thus with advantage be provided in the form of a processor with associated program memory including computer program code for performing the functionality of the control unit or control processor. It should be realized that this control unit or control processor can also be provided in the form of hardware, like for instance in the form of an Application Specific Integrated Circuit (ASIC). The computer program code can also be provided on a computer-readable means, for instance in the form of a data carrier, like a CD ROM disc or a memory stick, which will implement the function of the above-described control unit or control processor when being loaded into the above-mentioned program memory and run by the processor. One such computer program product in the form of a CD ROM disc 118 with such a computer program code 120 is schematically shown in FIG. 13.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

What is claimed is:

1. A method of informing a first network node of a wireless communication network of the presence of logged measurements from a first mobile station, the method comprising:
    performing measurements concerning one or more connectivity aspects for the first mobile station in relation to the wireless communication network, the measurements being performed according to a reporting configuration for the first mobile station;
    storing the measurements in an internal log; and
    sending a notification to the first network node regarding the presence of logged measurements in order to enable the first network node to respond to the notification with a request for a logged measurement report; and
    wherein the notification comprises a radio resource control connection setup complete message having a logged measurement indicator.

2. The method according to claim 1, further comprising repeating sending a notification if no request is received.

3. The method according to claim 1, wherein measurements are retained in the internal log if no request is received.

4. The method according to claim 1, wherein the performing of measurements is made in idle mode.

5. The method according to claim 1, wherein the notification comprises an indication of type of access technology used by the first mobile station when gathering data for the report.

6. The method according to claim 1, further comprising determining when to send the notification based on at least one notification timing criterion.

7. The method according to claim 6, wherein the notification timing criterion is based on one or more of the following properties: mobile station memory consumption, battery level, availability of measurements and load in network.

8. The method according to claim 1, further comprising receiving the reporting configuration from a network node.

9. The method according to claim 8, wherein the network node is the first network node.

10. The method according to claim 8, wherein the network node is a further network node, where the first and further network nodes use different types of access technology.

11. The method of claim 1, wherein the reporting configuration further comprises information indicating the extent of time the configuration is valid.

12. A first mobile station operative to inform a first network node of a wireless communication network about the presence of logged measurements, the mobile station comprising:
    a measurement performing circuit for performing measurements concerning one or more connectivity aspects for the first mobile station in relation to the wireless communication network, the measurements being performed according to a reporting configuration for the first mobile station; and
    a control circuit configured to
        order the measurements to be performed;
        store the measurements in an internal log; and
        order a transmitter to send a notification to the first network node regarding the presence of logged measurements in order to enable the first network node to respond to the notification with a request for a logged measurement report, wherein the notification comprises a radio resource control connection setup complete message having a logged measurement indicator.

13. The first mobile station of claim 11, wherein the reporting configuration further comprises information indicating the extent of time the configuration is valid.

14. The first mobile station of claim 11, wherein the control circuit is further configured to order a transmitter to repeat sending a notification if no request is received.

15. A computer program product operative to inform a first network node of a wireless communication network about the presence of logged measurements, the computer program product comprising a non-transitory computer readable storage medium comprising a set of instructions causing a control circuit in a mobile station to
    order measurements concerning one or more connectivity aspects to be performed in and for the first mobile station in relation to the wireless communication network, the measurements being performed according to a reporting configuration for the first mobile station;

store the measurements in an internal log; and order a transmitter to send a notification to the first network node regarding the presence of logged measurements in order to enable the first network node to respond to the notification with a request for a logged measurement report, wherein the notification comprises a radio resource control connection setup complete message having a logged measurement indicator.

16. The computer program product of claim 15, wherein the reporting configuration further comprises information indicating the extent of time the configuration is valid.

17. The computer program product of claim 15, wherein the instructions further order the transmitter to repeat sending a notification if no request is received.

18. A method of enabling a mobile station to inform a first network node of a wireless communication network of the presence of logged measurements, the method comprising:

determining to provide a first mobile station with a reporting configuration for sending logged measurement reports; and transmitting, from a network node to the first mobile station, the reporting configuration in order to enable the mobile station to send a notification to the first network node regarding the presence of logged measurements, wherein the notification comprises a radio resource control connection setup complete message having a logged measurement indicator.

19. The method according to claim 18, wherein the reporting configuration specifies that the first mobile station shall perform measurements when in idle mode.

20. The method of claim 18, wherein the reporting configuration further comprises information indicating the extent of time the configuration is valid.

21. The method of claim 18, wherein the reporting configuration further comprises information indicating that, if the mobile station does not receive a request for a logged measurement report from the first network node in response to sending the notification, the mobile station should repeat sending a notification.

22. The method of claim 18, wherein the method further comprises, in response to the first network node failing to respond to a first notification from the mobile station regarding the presence of logged measurements, receiving a second notification at the first network node from the mobile station regarding the presence of logged measurements.

23. The method of claim 18, further comprising storing the reporting configuration in memory of the network node for transmitting the reporting configuration.

24. A network node of a wireless communication network operative to enable a first mobile station to inform a first network node of the wireless communication network of the presence of logged measurements, the network node comprising:

a control circuit configured to provide the first mobile station with a reporting configuration for enabling the mobile station to send a notification to the first network node regarding the presence of logged measurements, wherein the notification comprises a radio resource control connection setup complete message having a logged measurement indicator; and a radio circuit and one or more antennas for transmitting the reporting configuration to the first mobile station.

25. The network node of claim 24, wherein the reporting configuration further comprises information indicating the extent of time the configuration is valid.

26. The network node of claim 24, wherein the reporting configuration further comprises information indicating that, if the mobile station does not receive a request for a logged measurement report from the first network node in response to sending the notification, the mobile station should repeat sending a notification.

27. The network node of claim 24, wherein the control circuit is further configured to determine the reporting configuration.

28. A computer program product operative to enable a mobile station to inform a first network node of a wireless communication network of the presence of logged measurements, the computer program product comprising a non-transitory computer readable storage medium comprising a set of instructions causing a network node in the wireless communication network to:

determine to provide a first mobile station with a reporting configuration for sending logged measurement reports;

transmit, from a network node to the first mobile station, the reporting configuration for enabling the mobile station to send a notification to the first network node regarding the presence of logged measurements, wherein the notification comprises a radio resource control connection setup complete message having a logged measurement indicator.

29. The computer program product of claim 28, the set of instructions causing the network node to further store the reporting configuration in memory of the network node for transmitting the reporting configuration.

* * * * *